No. 803,694. PATENTED NOV. 7, 1905.
A. JONES.
SCROLL SAW.
APPLICATION FILED MAR. 3, 1904.
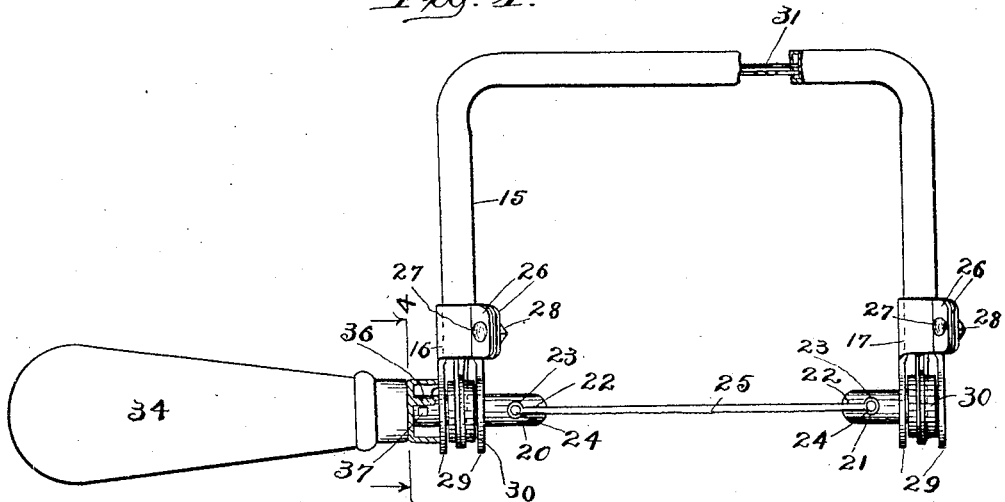
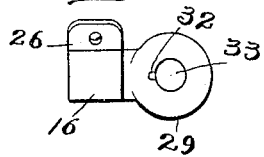
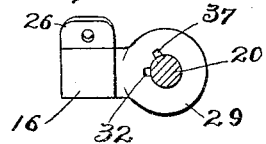
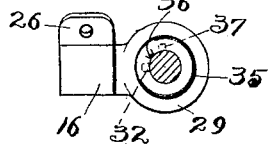
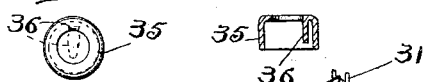
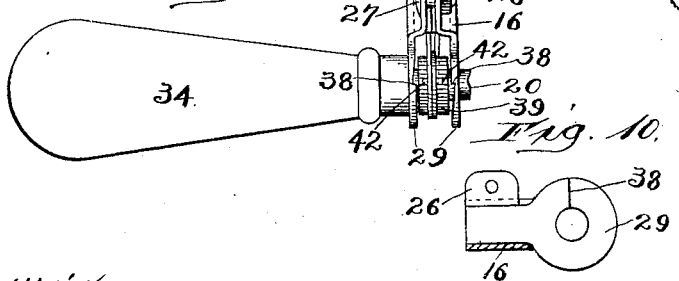
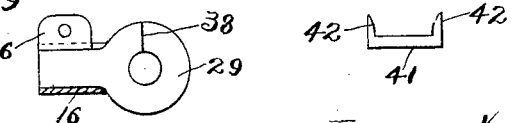
Witnesses:
Chas. E. Gorton.
A. Gustafson.
Inventor:
Arthur Jones
By Chas. C. Tillman
Atty.

UNITED STATES PATENT OFFICE.

ARTHUR JONES, OF CHICAGO, ILLINOIS.

SCROLL-SAW.

No. 803,694. Specification of Letters Patent. Patented Nov. 7, 1905.

Application filed March 3, 1904. Serial No. 196,307.

*To all whom it may concern:*

Be it known that I, ARTHUR JONES, a subject of the King of Great Britain, residing at Chicago, in the county of Cook and State of Illinois, have invented certain new and useful Improvements in Scroll-Saws, of which the following is a specification.

This invention relates to that class of saws to be operated manually and known as "scroll" or "coping" saws and used for cutting out intricate patterns in various kinds of material for ornaments and for doing other curved or irregular work.

The principal object of the present invention is to provide a simple and inexpensive saw of the above-named character which shall be of such construction that the saw-blade may be turned to any desired angle, so that the cuts or incisions may be made in any direction toward or from the operator. To effect this turning of the blade, a shaft which supports the saw is journaled on each end of the frame, and a pulley is mounted on each of said shafts, and an endless cable passes through the hollow frame and around the pulleys, thus gearing them together. In order to cause the cable to grip the pulleys, so as to turn them and their respective shafts in unison, it is usually passed one and one-half times or more around each of the pulleys. As the pulleys are mounted on the shafts between forked bearings on the frame, it is obvious that if the saw is turned too far in either direction it will cause the cable to climb and rewind on the first coils thereof, thus causing it to become slack after it is unwound and requiring frequent adjustment.

To obviate the above objection by providing means for automatically restricting or stopping the rotation of the shafts and pulleys thereon is another important object of the invention.

The invention consists in certain peculiarities of the construction, novel arrangement, and operation of the various parts thereof, as will be hereinafter more fully set forth and specifically claimed.

In order to enable others skilled in the art to which my invention pertains to make and use the same, I will now proceed to describe it, referring to the accompanying drawings, in which—

Figure 1 is a view in side elevation, partly in section, of a saw embodying one form of my invention, showing the frame broken to illustrate its construction and the location of the operating-cable. Fig. 2 is a side view of the clip or bearing for the handle-shaft, showing it detached from the frame. Fig. 3 is a similar view of said clip, showing the shaft in position. Fig. 4 is a like view of said clip, partly in section, taken on line 4 4 of Fig. 1 looking in the direction indicated by the arrows. Fig. 5 is a view in side elevation of the locking-sleeve, showing it detached. Fig. 6 is a sectional view thereof. Fig. 7 is a view in elevation of a portion of the frame and a part of the handle-shaft, showing a modified means for locking the said shaft. Fig. 8 is a detached perspective view of one of the pulleys used in the modified construction. Fig. 9 is a detail view of the locking-slide for said pulley; and Fig. 10 is a view, partly in section and partly in elevation, of the clip used in the modified construction.

Like numerals of reference refer to corresponding parts throughout the different views of the drawings.

The reference-numeral 15 represents the frame, which is hollow and preferably rectangular in cross-section, as shown. This frame is bent to form three sides of substantially a rectangular figure and has on its ends bearing-clips 16 and 17 for the shafts 20 and 21, respectively, which shafts are each provided with longitudinal slots 22, terminating in enlargements 23 to receive enlargements 24 on the ends of the saw-blade 25, which said shafts support. As shown in Fig. 1, the upper portion of each of the clips 16 and 17 is rectangular in cross-section to receive the ends of the frame, and each is provided with apertured flanges 26, in the openings of which flanges are located bolts 27, used in connection with nuts 28 to clamp the clips in position on the ends of the frame, the said clips being split, as shown in Fig. 1, and provided with prongs 29, in which the shafts 20 and 21 are journaled. Rigidly mounted on each of the shafts between the prongs 29 is a pulley 30, around each of which is wound an endless cable or cord 31, which extends through the hollow frame 15 and serves to unite or gear the pulleys and their respective shafts together. The outer prong 29 of the clip 16, which will be named the "handle-clip," is provided with a laterally-extending lug or projection 32, located near the opening 33, in which the shaft 20 is journaled.

On the outer end of the shaft 20 a handle 34 is mounted, and between the inner end of said handle and the outer prong 29 of the handle-clip 16 a locking-collar 35 is mounted, which collar is provided with an inwardly-extending projection 36 to engage the projection 32 on the clip 16, as well as the projection 37 of the handle-shaft. As shown in Fig. 1, the projection 36 of the collar 35 will extend between the projection 32 on the clip 16 and the projection 37 on the shaft 20, thus preventing the rotation of the shaft in one direction. By turning the shaft in the other direction it is apparent that the projection 37 thereon will impinge the opposite side of the projection 36 from that shown in Fig. 1, when the collar 35 will be turned with the shaft until its projection 36 strikes the opposite side of the projection 32 on the clip 16, thus locking the parts in position. By the foregoing arrangement it is apparent that the cable 31 will be prevented climbing and rewinding on the first coils thereof, yet the saw-blade may be turned to any suitable angle.

In Figs. 7 to 10, inclusive, I have shown a modification in the construction of the means for locking the shafts which carry the saw, which consists in providing the prongs 29 of the handle-clip 16 on their inner surfaces with oppositely-inclined recesses 38 and in employing a pulley 39, which is provided with a longitudinal groove 40, in which is located a locking-slide 41, which has its ends formed with upturned prongs 42, which are slightly beveled on their inner surfaces, as is clearly shown in Fig. 9. In the construction now under consideration it is apparent that the coil or coils of the cable 31 on the pulley 39 will lie between the prongs 42 of the slide 41, so that when the handle-shaft 20 is turned, by means of the handle 34, sufficiently in either direction the cable will contact with one of the beveled prongs 42, and thus cause the slide to engage one of the recesses 38, thus preventing the further movement in one direction of the shafts, and thereby preventing the cable climbing and rewinding on its first coils.

Having thus fully described my invention, what I claim as new, and desire to secure by Letters Patent, is—

1. In a scroll-saw, the combination with a hollow frame forked at each end and having bearings through the forks; of shafts journaled in said bearings, means leading through the frame and connecting the shafts at points within the forks to cause said shafts to turn in unison, a handle projecting from one shaft, and means connected with this shaft only for permitting its free oscillation to a limited extent and for positively preventing it from turning farther than said limit.

2. In a scroll-saw, the combination with a hollow frame forked at each end and having bearings through the forks; of shafts journaled in said bearings, a pulley on each shaft between the prongs of the fork, an endless cable passing through the frame and wound around said pulleys, a handle projecting from one shaft, and means connected with this shaft only for permitting its free oscillation to a limited extent and for positively preventing it from turning farther than said limit.

3. In a scroll-saw, the combination with a hollow frame forked at each end and having bearings through the forks; of shafts journaled in said bearings, a pulley on each shaft between the prongs of the fork, an endless cable passing through the frame and wound around said pulleys, a handle projecting from one shaft, and means connected with the pulley on the handle-shaft for permitting its free oscillation to a limited extent and positively preventing it from turning farther than said limit.

4. In a scroll-saw, the combination with a hollow frame forked at each end and having bearings through the forks; of shafts journaled in said bearings, a pulley on each shaft between the prongs of the fork, an endless cable passing through the frame and wound around said pulleys, a handle projecting from one shaft, and means connected with the pulley on the handle-shaft and operated automatically by the cord of the cable for permitting its free oscillation to a limited extent and positively preventing it from turning farther than said limit.

5. The combination with a hollow frame, of a forked bearing-clip located at each end thereof, the prongs of one of said clips having on their adjacent surfaces oppositely-inclined recesses, a shaft journaled in each of said clips and one of said shafts having a handle to turn the same, a pulley mounted on the handle-shaft between the prongs of the clip thereof and having a longitudinal groove, a locking-slide movably located in said groove and having at each of its ends a beveled prong, a pulley mounted on the other shaft between the prongs of its bearing-clip, a cable connecting and wound around the pulleys and supported by the frame, and a saw engaging the inner ends of the shafts, substantially as described.

ARTHUR JONES.

Witnesses:
 CHAS. C. TILLMAN,
 A. GUSTAFSON.